Dec. 8, 1936.   M. W. SEYMOUR   2,063,348
METHOD OF MAKING A COLORED PHOTOGRAPHIC IMAGE
Filed March 10, 1936

INVENTOR.
Merrill W. Seymour
BY
ATTORNEYS

Patented Dec. 8, 1936

2,063,348

UNITED STATES PATENT OFFICE 2,063,348

METHOD OF MAKING A COLORED PHOTOGRAPHIC IMAGE

Merrill W. Seymour, Rochester, N. Y., assignor, by mesne assignments, to Eastman Kodak Company, Jersey City, N. J., a corporation of New Jersey Application March 10, 1936, Serial No. 68,089

3 Claims. (Cl. 95—6)

This invention relates to a photographically sensitive layer and a method of making a monochromatic color image therefrom, and is specifically an improvement on the sensitive material disclosed in the patent of Alexander Murray, No. 1,965,710, granted July 10, 1934. I have discovered that if there is mixed with the material defined by Murray a substance, such as shellac, to which dye will be mordanted, the resulting relief image may be colored as desired.

As an example, the following solutions are made up:

Stock solution A

Dicinnamal acetone, technical grade_gms__ 5
Acetone _____cc__ 100

Stock solution B

Wax-free shellac_____gms__ 10
Methyl alcohol_____cc__ 100

Working solution

| | cc. |
|---|---|
| Stock solution A | 20 |
| Stock solution B | 10 |
| Benzene | 20 |

The working solution is spread on a suitable support and dried to a transparent coating. After exposure to a light image, it may be developed by swabbing with isopropyl alcohol and yields a relief image which will mordant a basic dye and hence yield a strongly colored monochromatic image. The dyes may be applied in solution in methyl, ethyl, or isopropyl alcohol or other suitable solvent, which may also be the developer. The dye may also be incorporated in the working solution prior to coating.

Examples of dyes which may be used to dye the relief image are: Basic Fuchsin, Rhodamin 6G, Malachite Green, Methylene Blue BB, and Auramine O, British Color Index numbers of which are, respectively, 677, 752, 657, 922 and 655.

In the formula given above, benzene appears to act as an inhibitor of crystallization for the light sensitive dicinnamal acetone, even though it is a volatile solvent, since there is found to be less tendency to crystallization when benzene is incorporated than when acetone and methyl alcohol are used as the only solvents. It is possible also that the shellac has some effect as an inhibitor, as well as the impurities present in the technical grade of dicinnamal acetone. The dicinnamal acetone will not, alone, accept the dye permanently and an additional material to which it will mordant is therefore necessary. This material may or may not be an inhibitor of crystallization for the light sensitive material.

Any other light sensitive material or inhibitor of the types disclosed in the Murray patent may be utilized.

Reference is made to the accompanying drawing wherein—

Figure 1:
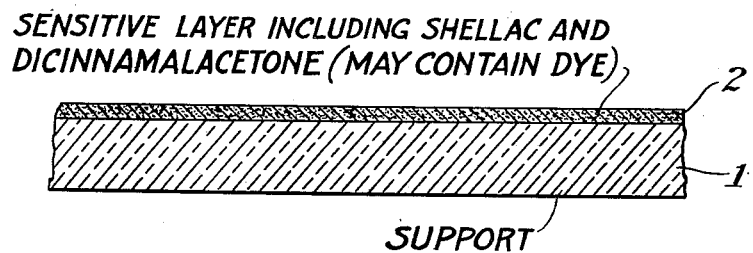
Fig. 1 is a section on an exaggerated scale of a sensitive element.
Figure 2:
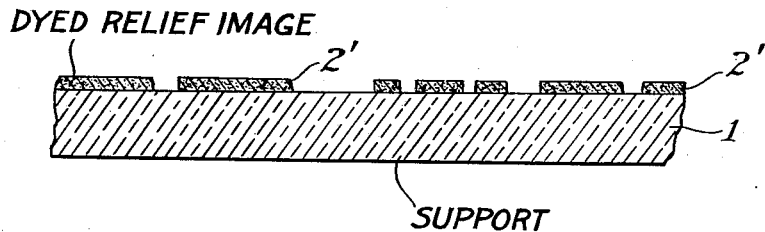
Fig. 2 is a similar section of dyed relief image made from such an element.

In these figures, 1 indicates a suitable support of glass, film or paper, and 2, a sensitive layer made in accordance with the example given above. In Fig. 2, the dyed relief image resulting from the use of the sensitive element is indicated at 2'.

It is to be understood that I contemplate as included within my invention all such modifications and equivalents as fall within the scope of the appended claims.

What I claim as new and desire to secure by Letters Patent of the United States is:

1. The method of forming a colored image that comprises exposing to a light image a sensitive layer comprising shellac, a crystallizable, halogen-free, organic, light sensitive substance capable of autogenic formation of insoluble, non-crystalline products when exposed to light and a substance which inhibits crystallization of the light sensitive material, developing the exposed layer to form a relief image and associating with the shellac a basic dye which is mordanted to the shellac, thereby forming a dyed relief image.

2. The method of forming a colored image that comprises exposing to a light image a sensitive layer comprising shellac, dicinnamal acetone, and material inhibiting crystallization of dicinnamal acetone, developing the exposed layer to form a relief image and associating with the shellac a basic dye which is mordanted to the shellac, thereby forming a dyed relief image.

3. The method of forming a colored image that comprises exposing to a light image a sensitive layer comprising shellac, dicinnamal acetone and a material inhibiting crystallization of the dicinnamal acetone, developing the exposed layer to form a relief image and coloring the image with a basic dye which attaches itself to the shellac in the relief image.

MERRILL W. SEYMOUR.